3,214,420
POLY(METHYLOLACRYLAMIDES)
Richard Henry Hunt, North Haven, and Daniel Elmer Nagy, Stamford, Conn., assignors to American Cyanamid Company, Stamford, Conn., a corporation of Maine
No Drawing. Filed Apr. 16, 1963, Ser. No. 273,305
7 Claims. (Cl. 260—89.7)

The present invention relates to poly(methylolacrylamido) polymers. More particularly, the invention relates to the preparation of (1) solid free-flowing water-soluble methylolated polymers of compounds having the formula (I)
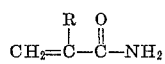

wherein R is hydrogen or an alkyl radical having from 1 to 4 carbon atoms or (2) solid free-flowing water-soluble polymers of compounds having the formula (II)
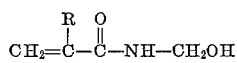

wherein R is as defined above in regard to Formula I.

Polymeric compounds of the above type in aqueous solutions are highly useful compositions suitable for a variety of applications such as a thickening agent in coating wood, formulations for paper or cellophane, as a backing for pile fabrics, in sizing and crease-proofing of textiles; in adhesive compositions; and the like. It has heretofore not been practical to produce dried poly-(methylolacrylamides) which retain their solubility after they are dried. All attempts to dry poly(methylolacrylamide) solutions by various conventional drying procedures have to our knowledge, resulted in insolubilizing the polymer. The obvious desirability in producing the material as a dried product is the avoidance of the increased costs and the difficulty involved in shipping and handling the polymeric material as a liquid solution, which comprises mostly water and which on merely standing tends to insolubilize in a matter of days. The difficulties encountered heretofore in producing a dried product by commercially feasible procedures are considered to be due to the fact the poly(methylolacrylamides) cross-link to a water-insoluble state very rapidly. The insolubilization is attributable to the cross-linking effect of the methylol group. Cross-linking to water insolubility after application of the resin is, of course, desirable and is one of the most important advantages of poly(methylolacrylamides). However, for practical application of the resin, it is extremely important that the polymer be soluble when it is being applied. Cross-linking is significantly accelerated upon heating of the methylolacrylamide polymer.

We have discovered that by proper adjustment of the pH of the aqueous polymer solution to be dried and by rapidly drying the polymer, it is possible to produce a dried product which is a fully water-soluble polymeric material. It is accordingly the primary object of the present invention to provide an economical and efficient method for preparing water-soluble poly(methylolacrylamides). Other objects and advantages will become apparent as the description of the invention proceeds.

The expression "poly(methylolacrylamide)" as used herein, denotes acrylamides which are methylolated either before polymerization or after polymerization, and the term is also intended to include degrees of methylolation ranging from about 5% up to the maximum obtainable, which is usually of the order of 90% or 90 combined CH$_2$OH groups per 100 nitrogen atoms. The expression "polymethylolmethacrylamide" likewise is used in a similar sense herein in respect to the methacrylic derivatives.

In essence, the invention resides in the adjustment of the pH of the poly(methylolacrylamide) solution to a range of from about 6 to 8.8 and the removal of water from the solution by rapid drying before the heat of the drying step may effect insolubilization of the polymer. Although there is some latitude in the heating period employed for the purposes of drying the polymer, i.e., the period may vary within limits depending on the molecular weight and concentration of the polymer in solution, it is critical that this heating period be controlled in order to preclude insolubilization of the polymer. In general, when drying at temperatures which may vary between about 90° C. and about 200° C., the polymer should not be exposed to heat for a period in excess of about 25–50 seconds depending on the temperature. Preferably, the drying period should not exceed about 30 seconds.

The nature of the invention and the procedural steps involved in producing the dried water-soluble product may be better understood by describing the drying of a poly(methylolacrylamide) on a drum dryer comprising two heated cylindrical drums counter-rotating with a close tolerance between the two drums. The polymer solution to be dried is applied at the top of the groove formed by the drums, forced between them and scraped off the drums by a suitable knife edge blade at a predetermined time. It will be apparent that although the procedure is described in conjunction with a pair of drum dryers, that various other known rapid drying procedures such as spray drying, and the like may be utilized in practicing the invention. It will be apparent also that a vacuum may be applied during the drying step, but this is not required and may add unnecessarily to the processing costs. We have found, as will be further illustrated by the examples which appear hereinbelow, that by adjusting the pH of the poly(methylolacrylamide) solution within the range of between about 6 and about 8.8, a sufficient length of time is afforded for drying the polymer before it cross-links to a condition of water insolubility. When the polymer solution has a pH outside this range, the polymer invariably is rendered substantially insoluble upon drying. The drying time may generally vary between about 5 and 50 seconds depending on the temperature, the thickness of the film which is being dried, which may be governed by the pressure of the drums on the polymer solution, and on the viscosity of the polymer. The preferred drying time is between 10 and 30 seconds. The preferred temperature is between about 110° C. and 150° C. although temperatures between about 90° C. and 200° C. may be used. It is important that the temperature of the poly(methylolacrylamide), prior to drying, not exceed room temperature and preferably is kept at temperatures below about 20° C. in order to preclude cross-linking and insolubilization prior to the time that the polymer is dried. It will be obvious that when drying the polymer, the time that the polymer is subjected to drying temperatures should be kept to a minimum. For example, when employing a drum dryer the polymer should not be permitted to accumulate on the drum but should be added thereto at a rate no greater than that which is immediately taken up by the drum surface.

The concentration of the polymer in solution may vary from about 3% in the case of higher molecular weight material (i.e. molecular weights of up to about 1,000,000) to about 40% in the case of solutions of polymers having molecular weights of about 10,000. Molecular weights contemplated are those as determined by intrinsic viscosity measurements at 25° C. using the Staudinger equation.

Suitable compounds for adjusting the pH of the poly(methylolacrylamide) solution to the range most conducive to stability, i.e., between pH 6 and 8.8, are acidic materials such as strong inorganic acids, e.g., hydrochloric, sulfuric, phosphoric acids and the like and various organic acids such as formic and acetic, oxalic, succinic, p-toluene sulfonic acid and the like and basic materials such as strong bases, e.g. sodium hydroxide, potassium hydroxide, etc. or other weaker bases including calcium hydroxide, ammonium hydroxide, sodium carbonate, etc., or amines such as the trialkylamines, e.g. triethylamine and the like.

When the poly(methylolacrylamide) is produced by first polymerizing an acrylamide and then methylolating the resultant polymer, the polymerization of the acrylamide compound may be conveniently accomplished by heating the monomer in aqueous solution or dispersion under acid or alkaline conditions preferably at a pH of 2 to 11 in the presence of 0.1 to 5% of a suitable catalyst. One method of polymerizing acrylamide and α-methylacrylamide is described in U.S. Patent No. 2,486,191. In that patent, acrylamide is polymerized in aqueous solution in the presence of 5 to 40% of a water-miscible alcohol such as ethyl alcohol, isopropyl alcohol and the like. In this manner, and as is shown in some of the examples given herein, polymers of controlled molecular weight may be obtained according to the percentage of alcohol employed. The preferred catalysts include the various water-soluble peroxygen compounds such as, for example, hydrogen peroxide, alkali metal persulfates, e.g., potassium persulfate, alkali metal perborates, e.g., sodium perborate, urea peroxide, and metal peroxides, e.g., sodium and potassium peroxides.

When the starting material for making the polymer is an acrylamide of relatively low water solubility, e.g., α-propyl or α-butyl acrylamide, an emulsifying agent may be employed in the polymerization step to assure intimate contact between monomer and catalyst. In such cases, water solubility is later achieved through reaction of the polymer with the aldehyde. Examples of emulsifying agents which may be used are the diamyl, dihexyl or dioctyl sulfosuccinic esters and salts thereof, salts of alkylated naphthalene sulfonic acids, sulfonated or sulfated high alcohols, e.g., lauryl sulfate, the salts of the sulfonated or sulfated higher alcohols, sulfonated oils, glycol oleates and linoleates, mineral oil sulfonates, aromatic sulfonates, alkali soaps, triethanolamine soaps and the like. The amount of emulsifying agent used is generally about 1 to 5%, by weight of the monomer.

The condensation reaction between the formaldehyde and the polyacrylamide, wherein the polymer is methylolated, is effected by mixing the two components in the desired proportions under alkaline conditions. The reaction between the formaldehyde and the polyacrylamide will take place upon mere mixing of the ingredients. It is preferred, however, to perform the reaction in aqueous medium at a temperature between about 0° C. and 70° C. and preferably below 35° C. The pH during methylolation is maintained alkaline, i.e., above pH of 8 and preferably at a pH between about 8.5 and 12.5. Methylolation of the polymer is considered satisfactory when a hydroxylamine test for free formaldehyde shows negligible take-up of additional formaldehyde by the polymer.

Instead of using formaldehyde to provide the methylol group in the polymer we may employ a compound engendering formaldehyde, for example, paraformaldehyde.

In adjusting the pH within the range most conducive to methylolation, various alkaline compounds well known to those skilled in the art may be employed such, for example, as sodium hydroxide, potassium hydroxide, lithium hydroxide, sodium carbonate or tertiary amines such as triethanolamine, triethylamine, trimethylamine and the like.

The poly(methylolacrylamide) is an addition polymer and is made up of chains of linked carbon atoms with single —CONHCH$_2$OH radicals attached to substantially alternate carbon atoms in each chain. In other words, about 50 percent of the carbon atoms in each chain are connected to the methylolamide groups. The proportions of these radicals may be increased or decreased by adjusting the quantity of formaldehyde in the methylolation reaction to less than stoichiometric proportions.

When the poly(methylolacrylamide) polymer is produced from a methylolacrylamide per se, the polymerization may generally be carried out in the same manner as described above in regard to the polymerization of acrylamide. That is to say, the polymerization of a methylolacrylamide monomer may be accomplished by heating the monomer, either in aqueous solution or dispersion, under a wide pH range, i.e. 2 to 11, in the presence of a suitable polymerization catalyst. For instance, the polymerization of methylolacrylamide may be carried out in the following manner.

Two hundred and twenty-five grams of demineralized water, buffered to a pH of 5.75 with potassium acetate and acetic acid, are placed in a one-liter, three-necked flask provided with a stirrer and a condenser. The solution is then warmed slowly to 50° C. during which time nitrogen is continuously introduced so as to bubble through the solution and sweep the flask and its contents free of oxygen or air. At this point there are added 25 grams of solid, crystalline methylol acrylamide, 0.500 gram of ammonium persulfate and 1.5 grams of isopropanol. The temperature of the mixture is raised to 60° C. and held there for 2 hours during which time the mixture is continuously stirred and the flask and its contents purged with nitrogen. The resulting polymeric solution, cooled to room temperature and pH adjusted to 7.5 with sodium hydroxide, has a Brookfield viscosity of 2,650 centipoises and a molecular weight as determined osmometrically of 60,000±500.

The methylolacrylamides, the polymerization of which is described above, may be produced by any known procedure, the most practical of which is set forth in U.S. Patent No. 3,064,050, filed January 3, 1961, and this patent is hereby incorporated into the instant specification by reference.

As stated previously, my polymers are characterized by having one of the following formulae

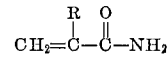

or

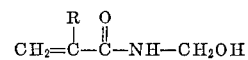

wherein R is hydrogen or a lower alkyl radical having from 1 to 4 carbon atoms. Thus, R may be any of the radicals methyl, ethyl, propyl and butyl, including secondary and tertiary radicals such as isopropyl, isobutyl, t-butyl and the like.

This application is a continuation-in-part of our U.S. application, Serial No. 814,970, filed May 22, 1959.

The following examples are set forth for purposes of illustration only and are not to be construed as limitations on the present invention. All parts and percentages are by weight unless otherwise indicated.

EXAMPLE 1

*Preparation of polyacrylamide*

200 parts of acrylamide and 1780 parts of deionized water are charged into a suitable reaction vessel equipped with a stirrer and reflux condenser. The mixture is heated to 70° C. and 5 parts of isopropanol and a solution of 0.36 part of potassium persulfate and 20 parts of water are added. Polymerization is effected by agitating and heating at 77° C. to 80° C. for 2 hours. 306 parts of this polyacrylamide solution (42.8% solids) having a molecular weight of about 100,000 (Brookfield viscosity) is diluted with 25 parts water and 42 parts of a 10% sodium hydroxide solution. 83.1 parts of 37% formaldehyde are then added. The pH value of the solution is 10.5. The temperature rises from 27° C. to 35° C. and is maintained below 35° C. by cooling when necessary. Portions of the reaction mixture are titrated for free formaldehyde by the hydroxylamine method, the mixture being stirred until no further formaldehyde is taken up, a period consuming between 1 to 1½ hours. The reaction mixture is then neutralized to a pH of 7.0.

The following data is taken during the above run:

| Time | pH | Temperature, ° C. | Ml. N/2 NaOH (Hydroxylamine Method) |
|---|---|---|---|
| 2:40 | 10.5 | 35 | 3.0 |
| 3:05 | 9.45 | 32 | 0.8 |
| 3:35 | 9.05 | 29 | 0.65 |
| 4:08 | 9.05 | 29 | 0.55 |

The viscous polymeric solution is then dried by feeding a slow stream of the solution to a double drum dryer which is internally heated by steam and maintained at a temperature of 150° C. The drums are revolved once in 22 seconds, the dried product being removed before a complete revolution thereof, i.e., after being in contact with the heated drum surface for about 20 seconds. The rate of addition of the polymer to the drums is such that material is immediately squeezed between the rolls and dried, the contact time being slightly less than 22 seconds. A fully water-soluble product is obtained.[1]

EXAMPLE 2

177 parts of polyacrylamide solution prepared as in Example 1 are charged into a reaction vessel and the pH is adjusted to 10.2 by the addition of 1.2 parts of trisodium phosphate. There are then added 20.3 parts of 37% formalin. The mixture is stirred and maintained at a temperature of about 32° C.±2° C. for 2 hours. The resulting viscous methylolated polyacrylamide solution has a pH of 8.5. The viscous polymeric solution is adjusted to a pH of 7.5 and fed to the double drum dryer as described in Example 1 with the contact time of the polymer on the drums having a temperature of 168° C., being 15 seconds. The product produced is readily soluble in water.

EXAMPLE 3

(a) 4 parts of potassium hydroxide are introduced into 20.3 parts of 37% formalin in a suitable reaction vessel. The resulting solution is added to 177.5 parts of 10% polyacrylamide having an average molecular weight of about 40,000. 200 parts of deionized water is added. The resulting mixture is heated at 25° C. to 30° C. for 30 minutes at a pH maintained at 11 and then cooled. The pH is then adjusted to 8.0 and the product is dried as described in the procedure for Example 1 on the double drum dryer with the dryer drum surface at a temperature of 140° C. The contact time of the polymer on the drum surfaces before removal by the knife scraper is 24 seconds. The dried methylolated polyacrylamide dissolves completely in one minute upon addition of sample quantity of 2 parts in 100 parts of water with stirring.

(b) The same polymer solution is dried at the same temperature (140° C.) with a contact time of the polymer on the surface of the drum dryer of 65 seconds. The methylolated polymer does not dissolve when 2 parts of polymer are added to 100 parts of water even after stirring for 90 minutes and standing overnight.

(c) The procedure of (a) above is repeated with the exception that instead of potassium hydroxide, triethylamine is employed in adjusting and maintaining the pH during methylolation at 11.5. A contact time of the polymer on the drum surface of 18 seconds at a temperature of 170° C. is used. The dried methylolated polyacrylamide produced is completely soluble in water.

EXAMPLE 4

The procedure of Example 1 is repeated with the exception that the polymer is permitted to remain on the drum surface for 60 seconds at the same temperature, i.e., at 150° C. The product obtained cannot be redissolved in water. 2 parts of the dry polymer product in 100 parts of water does not dissolve even after stirring for 90 minutes and standing overnight.

EXAMPLE 5

The process of Example 3(a) is repeated with the exception that the polymer solution is at a pH of 10.5 while being dried. The drying time, 30 seconds, and temperature of the drums, 140° C., is that employed in Example 3. The product obtained is substantially insoluble in water even after the product is stirred continuously for 90 minutes and is kept in water overnight.

EXAMPLE 6

To a suitable reaction vessel, equipped with a stirrer and condenser, are added 250 parts of demineralized water, at a pH of 5.7. The vessel is heated slowly to 50° C. and nitrogen is continuously bubbled through the contents so as to sweep oxygen and air therefrom. 25 parts of solid, crystalline methylolacrylamide, 0.5 part of ammonium persulfate, and 1.5 parts of isopropanol are then added. The temperature is increased to 60° C. and held for two hours during which the reaction media is continually agitated and purged with nitrogen. The resultant poly(methylolacrylamide) solution is then recovered after cooling to room temperature. The pH of the solution is adjusted to 7.0 with sodium hydroxide.

The polymer solution is then dried by feeding a stream of the solution to a drum dryer (2 drums) which is heated to a temperature of 140° C. The drums are set to revolve once in 24 seconds, the dried product being removed before each revolution. That is to say, the polymer is in contact with the drum for about 23 seconds. The product recovered is fully water-soluble when added to water and stirred for one minute.

EXAMPLE 7

A poly(methylolacrylamide) solution produced as described in Example 6, is adjusted to a pH of 8.0 with potassium hydroxide and fed to a two drum dryer, as in Example 1, with the drums having a temperature of 175° C., for a total contact time of 18 seconds. The dried product is readily soluble in water.

EXAMPLE 8

The procedure of Example 6 is again followed except that the pH of the polymer solution is adjusted to 6.5 with triethylamine. The contact time of the polymer on the drum at 120° C. is 38 seconds. The product is completely water-soluble.

EXAMPLE 9

Example 6 is again followed but the drum is adjusted so that the polymer is in contact therewith for 59 seconds. The product is water-insoluble even after having been allowed to stand in water for 15 hours.

EXAMPLE 10

Again following Example 6, a water-insoluble product is recovered when the pH of the polymer solution is adjusted to 9.9 instead of 7.0, even after the product is in contact with water for 12 hours.

EXAMPLE 11

The procedure of Example 6 is again followed except that the pH of the polymer solution is adjusted to 5.0 with hydrochloric acid. The product is water-insoluble even after contact with water for 8 hours.

---

[1] The dried product when added to water appeared initially insoluble (i.e., swelled only) but upon standing without additional stirring went into solution completely.

We claim:
1. A method for preventing the gelation and cross-linking of a poly(methylolacrylamide) produced in an aqueous solution, which comprises adjusting the pH of said solution to a range for from about 6 to 8.8 and drying said poly(methylolacrylamide) in a period of less than 50 seconds at a temperature between 90° C. and 200° C.

2. A method for preventing the gelation and cross-linking of a poly(methylolacrylamide) produced by polymerizing, in an aqueous solution, a monomer having the formula

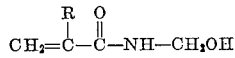

wherein R is selected from the group consisting of hydrogren and an alkyl radical having from 1 to 4 carbon atoms, inclusive, which comprises adjusting the pH of said solution to a range for from about 6 to 8.8 and drying said poly(methylolacrylamide) in a period of less than 50 seconds at a temperature between 90° C. and 200° C.

3. A method for preventing the gelation and cross-linking of a poly(methylolacrylamide) produced by polymerizing, in an aqueous solution, methylolacrylamide which comprises adjusting the pH of said solution to a range for from about 6 to 8.8 and drying said poly(methylolacrylamide) in a period of less than 50 seconds at a temperature between 90° C. and 200° C.

4. A method for preventing the gelation and cross-linking of a poly(methylolacrylamide) produced by polymerizing, in an aqueous solution, a monomer having the formula

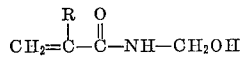

wherein R is selected from the group consisting of hydrogen and an alkyl radical having from 1 to 4 carbon atoms, inclusive, which comprises adjusting the pH of said solution to a range for from about 6 to 8.8 and drying said poly(methylolacrylamide) in a period of less than 10 to 30 seconds at a temperature between 110° C. and 150° C.

5. A method for preventing the gelation and cross-linking of a methylol acrylamide polymer produced by methylolating, in an aqueous solution, a polymer of a compound having the formula

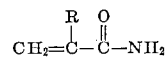

wherein R is selected from the group consisting of hydrogen and an alkyl radical having 1 to 4 carbon atoms, inclusive, at a temperature not exceeding 70° C. and at a pH of above 8, which comprises adjusting the pH of the aqueous methylolated polymer solution to a range of from about 6 to 8.8 and drying said methylolated polymer in a period of less than 50 seconds at a temperature between 90° C. and 200° C.

6. A method for maintaining the water-solubility of methylol polyacrylamide produced by methylolating an aqueous solution of polyacrylamide at a temperature not exceeding 70° C. and at a pH of above 8, which comprises adjusting the pH of the aqueous solution of methylol polyacrylamide to a range of from about 6.0 to 8.8 and drying said methylol polyacrylamide in a period of less than 50 seconds at a temperature between 90° C. and 200° C.

7. A method of preventing the cross-linking of methylol polyacrylamide produced by methylolating an aqueous solution of polyacrylamide at a temperature not exceeding 70° C. and at a pH of above 8.0, which comprises adjusting the pH of the aqueous solution of methylol polyacrylamide to a range of 6 to 8.8 and drying said methylol polyacrylamide in a period of from 10 to 30 seconds at a temperature between 110° C. and 150° C.

No references cited.

JOSEPH L. SCHOFER, *Primary Examiner.*